Patented Feb. 6, 1940

2,189,481

UNITED STATES PATENT OFFICE 2,189,481

FILMS, FILAMENTS, AND OTHER SHAPED ARTICLES MADE BY HARDENING PROTEINS COAGULATED FROM THEIR SOLUTIONS

David Traill, Ardrossan, Scotland, assignor to Imperial Chemical Industries Limited, a corporation of Great Britain No Drawing. Application May 24, 1938, Serial No. 209,854. In Great Britain March 24, 1937

8 Claims. (Cl. 18—54)

The present invention relates to a process for improved films, filaments, and other shaped articles made by hardening proteins coagulated from their solutions. The process of this invention consists essentially in subjecting the hardened protein articles to an after-treatment with HCl or a suitable chloride of an acid or a non-metallic element, whereby the resistance of the articles to hot acid dye baths and the like is improved, and water-repellent properties are also improved, as described more fully hereinbelow.

In the preparation of films, filaments and the like from proteins, the protein is usually dissolved in a dilute alkaline solution and extruded into an acid bath; but other types of solvent and coagulating media are sometimes employed, as for instance, in the preparation of filaments, films and the like according to British Patent No. 467,704, according to which the protein is dissolved in a bath containing a degenerating or denaturing agent such as aqueous urea. The hardening agent employed is usually formaldehyde or one of its near conversion products.

Films, filaments and shaped articles prepared from proteins in this manner are possessed of many excellent qualities, but in general they offer poor resistance to hot acid solutions such as are used in dyeing.

This invention has as an object to devise a method of improving the resistance of such hardened coagulated proteins to hot acids. A further object is to devise a method of giving such hardened coagulated proteins a water-repellent finish and a soft handle. A further object is to devise a method whereby the extensibility of such hardened coagulated proteins can be increased. A still further object is to provide hardened coagulated proteins having enhanced resistance to hot acid, and also improved water repellency, handle, and extensibility. Further objects will appear hereinafter. These objects are accomplished by the following invention.

I have found that filaments, films and other shaped articles made from protein solutions by coagulation and treatment with a hardening agent, especially formaldehyde or a nearly related material, can be improved in their resistance to hot acids or their water-repellent properties or both, and that other desirable improvements (in particular, an increase in their extensibility) can be obtained, by a treatment wherein the shaped articles are subjected for a period of time to the action of hydrogen chloride as such, or of a suitably reactive chlorine compound such as a chloride of an organic acid or inorganic acid or non-metallic element. The suitable reactive chlorine compounds contain chlorine in a loosely-bound condition such that hydrolysis will yield HCl. For example, thionyl chloride ($SO_2Cl_2$), which is well suited for the purposes of this invention, readily yields HCl upon hydrolysis. Numerous other materials containing chlorine in a similar state of combination are useful in the present process, although operations are in a dry system; a system in which there is no moisture present except that contained in the protein articles themselves, that is, the "natural water content" or water of condition.

The hydrogen chloride or reactive chlorine compound may be employed at ordinary or raised temperature in vapour or liquid form, or dissolved in a non-aqueous indifferent solvent, preferably of the non-polar type.

The following examples illustrate but do not limit the invention.

Example 1

The filaments to be improved can be made by extracting the protein from peanuts (*Arachis hypogaea*) with a saline or alkaline solution and precipitating the protein with sulphur dioxide or sulphurous acid; whereupon the coagulated, washed and dried protein is dissolved in a concentrated aqueous solution of urea and, after being allowed to age, is spun by extrusion into a bath containing ammonium sulphate, sulphuric acid, glycerol, zinc chloride and water at a temperature of about 50° C. The filaments are wound on a reel, washed and treated with commercial formaldehyde solution, and dried. These operations are carried out as described in said British Patent No. 467,704.

Hanks of hardened filaments so produced are capable of being dyed with wool dyes and, as a matter of fact, they have a greater affinity for the dyes than that of wool itself, but the difficulty arises that the filaments are swollen or even partially dissolved when dyed in the baths and under the conditions ordinary in effective dyeing of wool. Moreover, the filaments when removed from such a dye bath and washed and dried tend to become brittle. The hanks tend to form a brittle mass.

Under the present invention, hanks of the hardened protein filaments or thread are immersed in a benzene solution containing about 20 gm. thionyl chloride per litre of benzene. The solution is used in such quantity that one-tenth part by weight of thionyl chloride is present to each part of protein. The treatment is carried out for one day in a closed vessel at a temperature of 35°-40° C. The excess of solution is drained off and the material is hydro-extracted. In the removal of the benzene alcohol may be employed, and the material is treated with an aqueous solution of feeble alkalinity and is then thoroughly washed with water and dried in a current of air.

A product prepared according to this example is found to be unaffected by treatment in a bath containing 0.1 per cent sulphuric acid and 0.25 per cent sodium sulphate, and a microscopic examination shows that the filaments have improved water-repellent characteristics.

Example 2

The protein filaments obtained from the protein extracted from ground nuts (peanuts) with an alkaline solution as described in Example 1 are employed. The material is treated as described in Example 1 with a similar volume of a solution containing only one-tenth of the amount of thionyl chloride used in Example 1 for about 5 days in a closed vessel at 35°–40° C. The material obtained on working up has a pleasant soft handle, and has satisfactory acid-resisting properties.

Example 3

Protein filaments obtained from the peanut protein extracted by means of alkali as described in Example 1 are immersed for two days at 35°–40° C. in a solution containing 50 gm. thionyl chloride to a litre of trichlorethylene, the amount used being such that one-quarter part of thionyl chloride is present to each part of filament by weight. The material is worked up as in the previous examples. The product has a soft handle and its resistance to the acid dye bath and its hydrophobic properties are noticeably improved.

Example 4

In making the threads from an alkaline solution of the protein the precipitating bath employed in spinning the filaments consists of a saturated aqueous sodium sulphate solution with an addition of ½–1 per cent of its weight of sulphuric acid, and is used at a temperature around 30° C., but otherwise the preparation of the protein filaments is carried out as in Example 1. Hanks of the filaments are treated for one day at 35° C. with a solution containing 21 gm. sulphur monochloride to a litre of benzene, the amount used being such that 0.1 part sulphur monochloride is present to each part of filament by weight.

Example 5

The filaments used are as in Example 3. A solution containing olive oil and thionyl chloride in the ratio 10:8 is distributed through 10 times its weight of the filaments, which are then stored for about three to six weeks in a closed vessel. The product has a soft handle and is considerably resistant to dilute aqueous acid.

Example 6

The treatment is carried out as in the preceding example with the substitution of phosphorus oxychloride for thionyl chloride, with similar results.

Example 7

The filaments used are as in Example 3. In this case acetyl chloride is substituted for the thionyl chloride of Example 3, and the treatment is carried on for ten days.

Example 8

Filaments of peanut protein spun as described in Example 1 are immersed for 24 hours at 35° C. in a 2 per cent solution of phosphorus pentachloride in benzene. The treated filaments showed increased water-repellency and resistance to attack by acid baths.

Example 9

Filaments of peanut protein spun as described in Example 1 are heated under a reflux condenser for 3 hours with a 5 percent solution of adipyl chloride in benzene. The treated filaments showed increased water-repellency and resistance to attack by said baths.

Example 10

Filaments of peanut protein spun as described in Example 1 are immersed in a 2.5 per cent solution of nitrosyl chloride in benzene, first for 2 days at 35° C., and subsequently for 2 days at 20° C. The treated filaments show increased resistance to wetting and to attack by acids.

Example 11

Filaments of peanut protein, spun as described in Example 1, are treated for 2 days at 35° C. with a 2 per cent solution of sulphuryl chloride in benzene. The treated filaments show increased resistance to wetting and to attack by acids.

Example 12

Two samples of peanut protein filament spun as described in Example 1 were treated at 35° C. with a benzene solution of adipyl chloride; one with a 2 per cent solution for 16 hours, and the other with a 0.2 per cent solution for 3 days. Both treated samples show increased resistance to wetting and to attack by acids.

Example 13

Hanks of the protein filaments are immersed in a 0.45 per cent solution of dry hydrogen chloride in benzene at a temperature of 20° C. for three days. At the end of this time the fibres are hydroextracted and washed free from hydrogen chloride, and when free from hydrogen chloride are dried in a current of air.

The product prepared according to this example is found to be unaffected by treatment in a bath containing 0.1 per cent sulphuric acid and sodium sulphate, and a microscopic examination shows that the filaments have improved water-repellent characteristics.

Example 14

Hanks of the protein filaments are festooned in a heated chamber which can be rendered gas-tight and can be heated up to 100° C., and the chamber is filled with thionyl chloride gas and maintained at an internal temperature of about 80° C. for a period of time which may vary according to the temperature, the pressure and other variable factors, but will usually be about from 1 to 6 hours, until the material has developed sufficiently acid-resisting qualities, which will easily be recognized by a test with hot dilute acid. A product prepared according to this example is found to be practically unaffected by treatment in a bath containing 0.1 per cent sulphuric acid and 0.25 per cent sodium sulphate for 90 minutes at 97° C., and a microscopic examination shows that the filaments have acquired improved water-repellent characteristics.

Example 15

The filaments employed are obtained from casein by extruding an aqueous urea solution of the protein into a warm coagulating bath, and subjecting the washed hanks to a formaldehyde treatment. The hanks are then festooned in a chamber and treated with the vapour of oxalyl chloride at a temperature of 80° C. for 1 to 3 hours whereby the water-resistance and resistance to acid dye baths are improved.

Example 16

A hank of commercial casein filaments, which when subjected to treatment in a bath containing 0.1 per cent sulphuric acid, and 0.25 per cent sodium sulphate at 97° C. would be converted into a horny little bundle of filaments having poor water resistance, was subjected to treatment with thionyl chloride vapour for 1 to 4 hours at 80° C. After such treatment the filaments successfully withstand the above acid bath treatments for 90 minutes, and water-repellent properties are manifest.

*Example 17*

Protein filaments produced as described in the first paragraph of Example 1 are found to break under tension at an elongation of 25.1 per cent on the unstretched fibre. The fibres so produced, when treated for 2 days at 35° C. with a 2 per cent solution of sulphur dichloride ($SCl_2$) in benzene, show increased resistance to acids and an elongation at breaking point of 63.3 per cent on the original fibre length.

Suitable reactive chlorine compounds for the present purposes are the chlorides of organic or inorganic acids and of non-metallic elements; for instance phosgene, oxalyl chloride, furoyl chloride, acetyl chloride, adipyl chloride, thionyl chloride, sulphuryl chloride, sulphur monochloride, sulphur dichloride, phosphorus trichloride, phosphorus pentachloride, phosphorus oxychloride and nitrosyl chloride.

The reactive chlorine compounds containing two or more chlorine atoms directly attached to a non-metallic atom have the useful property of conferring increased extensibility on the treated filaments.

When sulphuryl chloride vapour is used at raised temperatures, care should be taken to guard against the presence of excessive moisture, for example by preventing the access of atmospheric moisture to the system, and by reducing somewhat the natural water content of the artificial material beforehand; and the material should be prevented from coming into direct contact with condensate, since the effect of sulphuric acid formed by hydrolysis is harmful.

As solvents for treating baths used on hardened filaments under the present invention I may employ volatile solvents such as trichlorethylene, ligroin, toluene, benzene, or mixtures of these; but non-violatile solvents may also be used, for example olive oil or Turkey red oil.

It will be understood that the solvent must not react chemically with the chlorine compound, and should be indifferent to the protein.

For textile operations it is somewhat convenient to treat textile filaments with olive oil or the like, in which case the treatment with the chlorine-containing compound may conveniently be combined with this operation by using a solution of the chlorine-containing compound in the oil instead of the pure oil.

The improvement produced in the acid resisting properties of the material does not increase indefinitely with increasing time of treatment, but tends to reach a value beyond which no noticeable improvement takes place with increasing duration of the treatment.

It is desirable to stop the treatment once this has been attained, since undue prolongation may tender the material.

The development of harshness in the handle of the dried treated material is an indication that a longer treatment has been given than is necessary to bring about the desired improvement in properties.

The appearance of insufficiently treated material may be recognized by its swelling when treated with hot dilute aqueous acid, and coalescing on removal therefrom to form a stiff bundle.

This invention is a valuable advance in the art as it comprises a process which increases the usefulness of protein filaments and articles. The softer handle resulting from this process makes the filaments more useful for textiles, while the water repellancy increases the life of articles made from these proteins, and the possibility of dyeing from any ordinary acid type dyeing bath without sacrifice of quality adds enormously to the colour range in which these proteins can be produced.

As many apparently widely different embodiments of this invention may be made without departing from the spirit and scope thereof, it is to be understood that the invention is not limited to the specific embodiments thereof, except as defined in the appended claims.

I claim:

1. Artificial filaments of hardened coagulated proteins characterized by water-repellent surfaces, by a soft handle, and by sufficiently high resistance to deterioration by hot dilute aqueous acid solutions to enable them to be dyed satisfactorily in acid wool dyeing baths.

2. A process for the treatment of shaped articles of hardened coagulated protein, which comprises the step of treating the said articles with a reactive chlorine compound selected from the class consisting of hydrogen chloride, chlorides of organic acids and inorganic acids, and chlorides of non-metallic elements, the treatment being effected in a substantially non-aqueous medium and being effective to improve the resistance of the said articles to dilute aqueous solutions of acids.

3. The process of claim 2, wherein the said chlorine compound is applied in gaseous form.

4. The process of claim 2, wherein the said chlorine compound is applied in the form of a solution in a non-aqueous solvent indifferent to the said protein.

5. The process of claim 2, wherein the said treatment is effected at a temperature above 20° C.

6. The process of claim 2, wherein the said chlorine compound is a chloride of an acid containing at least two carboxyl groups.

7. The process of claim 2, wherein the said protein is peanut globulin.

8. The process of converting peanut protein into artificial filaments having sufficient resistance to dilute aqueous acids to enable them to be dyed satisfactorily in acid wool-dyeing baths, which comprises extruding an aged dispersion of the protein into a bath which coagulates the protein in the form of a filament, hardening the coagulated protein filament, and treating the hardened filament with a reactive chlorine compound selected from the class consisting of hydrogen chloride, chlorides of organic acids and inorganic acids, and chlorides of non-metallic elements, the treatment being effected in a substantially non-aqueous medium and being effective to improve the acid-resistance of the said filament.

DAVID TRAILL.